United States Patent [19]
Panetta

[11] 3,820,209
[45] June 28, 1974

[54] STRAIGHT EDGE FILE HOLDER
[76] Inventor: Dominic J. Panetta, 8109 Grayfield, Dearborn Heights, Mich. 48127
[22] Filed: Apr. 10, 1972
[21] Appl. No.: 219,982

[52] U.S. Cl. ................................................ 29/80
[51] Int. Cl. ............................................ B23d 71/04
[58] Field of Search .................... 29/78, 80; 76/82; 51/217 R, 217 A, 217 P; 269/1, 3; 30/289, 294

[56] References Cited
UNITED STATES PATENTS
| | | | |
|---|---|---|---|
| 1,628,791 | 5/1927 | Krook | 29/80 X |
| 2,871,729 | 2/1959 | Schoonover | 29/80 X |
| 3,501,821 | 3/1970 | Ford | 29/80 |

FOREIGN PATENTS OR APPLICATIONS
| | | | |
|---|---|---|---|
| 7,719 | 12/1893 | Switzerland | 29/80 |

*Primary Examiner*—Andrew R. Juhasz
*Assistant Examiner*—W. R. Briggs

[57] ABSTRACT

This provides a tool to hold any flat file comprising an angle plate, and a holding clamp and constructed of material that is light in weight and maintains strength. Means are incorporated in the tool to provide a true and square surface on the edge of any metal or wood stock.

3 Claims, 2 Drawing Figures

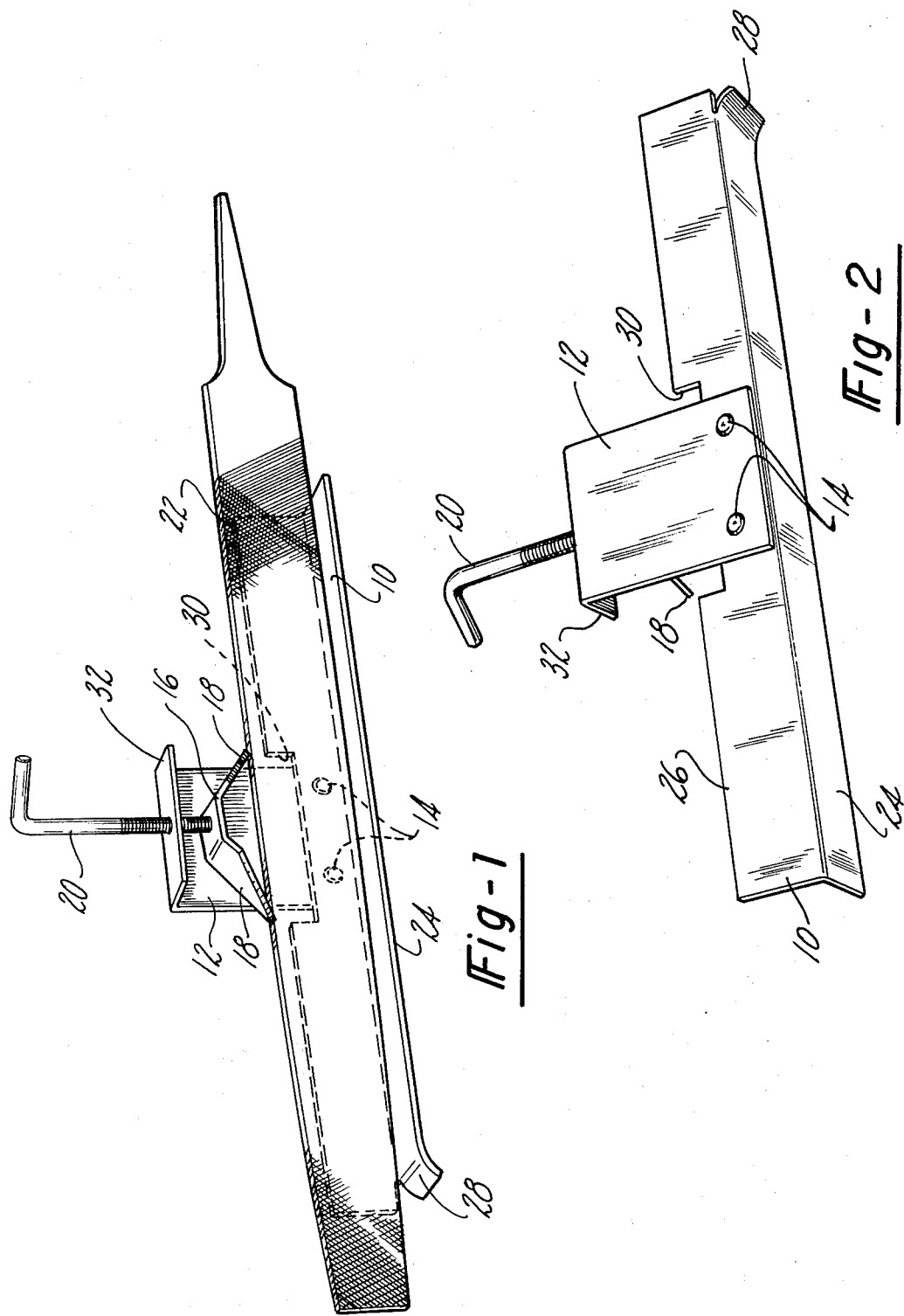

STRAIGHT EDGE FILE HOLDER

BACKGROUND OF THE INVENTION

Trying to maintain a true or squared surface on the end of any wood or metal stock is impossible with the use of a free hand file and a portable power sander. The use of a power disc table sander would involve a costly and unnecessary expense unless it were put to considerable use and does not give the flexibility of a hand tool.

SUMMARY OF THE INVENTION

It is the object of this invention to construct a versatile tool holder for receiving and clamping a flat file for use in producing a squared edge. The tool can be used in any position, or direction and is portable for use in any location.

The subject tool holder can be made from steel, aluminum, magnesium, heavy duty plastic, or a combination of any of the above materials. It is an inexpensive tool that can be used by a professional craftsman, or any amateur handyman in his work.

BRIEF DESCRIPTION OF DRAWINGS

FIG. 1 is a front perspective view of a tool holder and file illustrating the subject invention; and, FIG. 2 is a rear perspective view of the tool holder of FIG. 1, but with the file removed therefrom.

DESCRIPTION OF THE SPECIFIC EMBODIMENT

An embodiment of the straight edge file holder in accordance with the invention is described with reference to the accompanying drawings.

In FIGS. 1 and 2, the illustrative embodiment is shown to comprise a base 10 in the form of a rigid aluminum angle having an L-shaped cross section, a clamp support plate 12 of rigid metal such as steel secured such as by rivets 14 to the base 10, a tool clamp 16 having spread fingers 18 and a bolt 20 threadedly engaging the plate 12 and having the clamp 16 rotatively secured to the lower end thereof. Accordingly, a flat tapered file 22 may be clamped on edge between the clamp 16 and base 10 for use in producing squared edges on a workpiece.

Base 10 comprises integral planar sections 24 and 26 joined at an angle of precisely ninety degrees to receive the file 22 with one flat work surface flush against section 26 and an edge against section 24. Section 24 has one end thereof severed from section 26 along the joint and is turned down to provide a foot 28 which lifts one end of base slightly when placed on a horizontal support surface. The rise is such as to compensate for the taper of a conventional file so that the centerline (longitudinal) of the file 22 is parallel to the support surface on which base 10 rests.

Base 10 is cutaway at 30 adjacent the clamp support plate 12. The plate 12 is parallel to section 26, is secured thereto adjacent cutaway 30, and is bent 90° to form flange 32. The flange 32 is bored and threaded to form a hole for the receipt of bolt 20. When in the flange, the threaded body of bolt 20 is orthogonal to base section 24.

The clamp 16 is rigid steel and is loosely but permanently secured to the end of bolt 20 to permit enough pivotal play for fingers 18 to fully engage the edge of file 22 and to permit the bolt 20 to rotate during insertion and removal of the file. The plate 12 keeps the clamp 16 from turning during adjustment.

The holder, thus, maintains the centerline of file 22 horizontal and the working surface vertical so as to facilitate the production of a squared edge on a workpiece to be filed.

The following specifications have been found satisfactory for an actual device:

Clamp 16 — Flat galvanized steel 3/32 inch by 2-11/16 inches by 11/16 inch, the ends cut at a 45° angle with a 1/16 inch flat surface and bent at a 45° angle. The base cut out on each side 21/32 inch by 1/16 inch, and a 13/64 inch hole drilled in the center to receive the recessed end of the bolt.

Bolt 20 — The bolt is ¼ inch 20 by 2⅝ inches, one end recessed 3/16 inch diameter by 3/16 inch length to fit the angle holding plate. The other end is L-shaped to act as a handle to turn the bolt. The recessed end is peened at assembly with clearance to allow the bolt to turn in the angle holding plate.

The plate 12 — Flat galvanized steel 1/16 inch by 1⅞ inches by 3⅛ inches with a ½ inch 90° bend on one end. A 17/64 inch hole drilled and ¼ inch -20 hex nut welded to the ½ inch -90° end. Two ⅛ inch countersunk holes drilled in plate for mounting on straight edge piece No. 4 with rivets.

The base 10 — Straight edge aluminum angle 1 inch by 1 inch by 9¼ inches of 1/16 inch stock with the leading edge of the top and side bent at a slight angle and the center section of the top cut out 5/16 inch by 2⅝ inches to mount the screw holder plate No 3 and the file holder No. 2. Drill two ⅛ inch holes in the top side of the straight edge for mounting with flush type rivets.

The subject tool holder can be made from steel, aluminum, magnesium, heavy duty plastic or a combination of any of the above materials.

I claim:

1. A file holder comprising: a base defining a pair of orthogonally intersecting longitudinal support surfaces for receiving a flat file and for supporting the file with a working surface thereof exposed, a clamp support secured to the base, and clamp means carried by the clamp support for engaging an edge of the file opposite one of the support surfaces, said clamp means being adjustable relative to said opposite one of the support surfaces for permitting insertion and removal of the file, and a foot adjacent one longitudinal end of the base for raising the height of said one end relative to the other end such that the longitudinal centerline of a tapered file in said file holder is substantially horizontal when placed on a substantially horizontal support surface.

2. A file holder as defined in claim 1 wherein the clamp means includes a bolt threadedly engaging said clamp support and a clamp member loosely secured to the bolt such that the bolt may be rotated without rotating the clamp member, said clamp member having longitudinally oppositely extending fingers which engage an edge of the file when the file is placed in the tool holder.

3. A file holder as defined in claim 2 wherein the base comprises a rigid angle member having a substantially L-shaped cross section, the plane surface of the angle opposite the clamp means being bent downwardly at one longitudinal end of the base to provide a foot which, when the base is disposed on a flat support surface, raises said one end of the base higher than the other to compensate for a tapered flat file and to orient the longitudinal centerline of the file substantially parallel to the flat support surface.

* * * * *